United States Patent [19]

Ohtaka

[11] Patent Number: 4,712,901
[45] Date of Patent: Dec. 15, 1987

[54] SHARP FOCUS DETECTING DEVICE

[75] Inventor: Keiji Ohtaka, Kanagawa, Japan

[73] Assignee: Canon Kabushiki Kaisha, Tokyo, Japan

[21] Appl. No.: 805,404

[22] Filed: Dec. 4, 1985

Related U.S. Application Data

[63] Continuation of Ser. No. 576,858, Feb. 3, 1984, abandoned.

[30] Foreign Application Priority Data

Feb. 5, 1983 [JP] Japan .............................. 58-15699[U]

[51] Int. Cl.$^4$ ................................................. G03B 3/00
[52] U.S. Cl. ..................................... 354/407; 354/408
[58] Field of Search ................ 354/402, 406, 407, 408

[56] References Cited

U.S. PATENT DOCUMENTS 4,189,218  2/1980  Saito et al. ........................... 354/407
4,322,615  3/1982  Fukuhara ............................ 354/402
4,460,261  7/1984  Eguchi et al. ...................... 354/408

Primary Examiner—Russell E. Adams
Attorney, Agent, or Firm—Toren, McGeady & Associates

[57] ABSTRACT

A device for distinguishing focusing conditions of an objective lens by a plurality of optical apparatus for forming images based on respective light beams passing through different areas of a pupil of the objective lens and photo-electric transducing apparatus for sensing the degree of coincidence of the images formed by the optical apparatus. The aforesaid optical apparatus are in contact with each other increasing the amount of one of the light beams passing through the pupil of the aforesaid objective lens, which is conducted to the aforesaid optical apparatus, wherein the contacted portion of each optical apparatus is provided with light-shielding apparatus.

6 Claims, 8 Drawing Figures

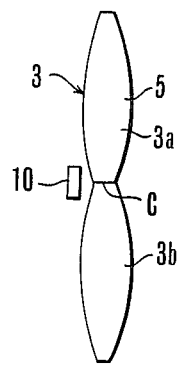
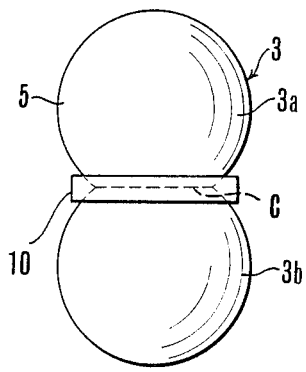
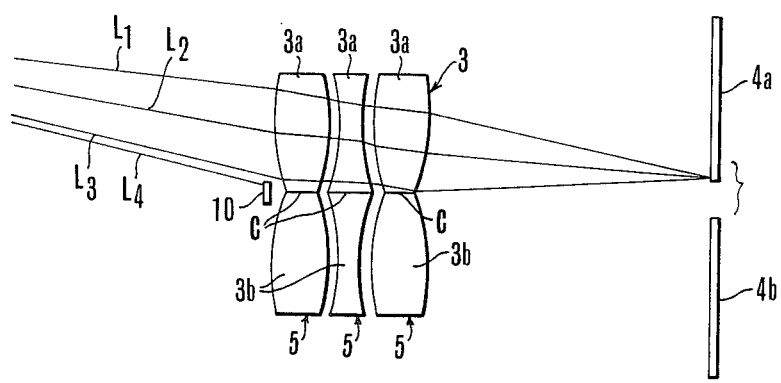
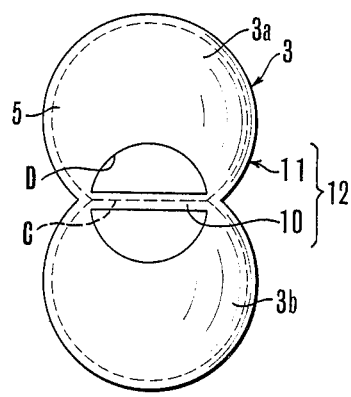
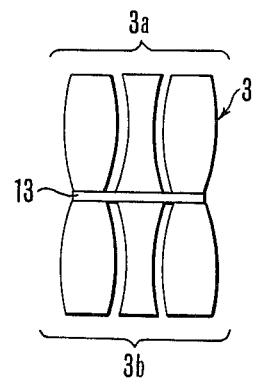

SHARP FOCUS DETECTING DEVICE

This is a continuation of application Ser. No. 576,858, filed Feb. 3, 1984, now abandoned.

BACKGROUND OF THE INVENTION

1. Field of the Invention

This invention relates to sharp focus detecting devices of the TTL type incorporated in photographic instruments such as single lens reflex cameras.

2. Description of the Prior Art

Many methods have been proposed for this type of sharp focus detecting device. Of these, the secondary imaging method is an optical system such as that shown in FIG. 1. In this optical system as applied to the single lens reflex camera, a field lens 2 is positioned near or at a prescribed focal plane A of a photographic objective lens 1. At the rear of the field lens 2 is positioned an image re-forming optical system 3 comprising two image forming lenses 3a and 3b, symmetrically arranged with respect to an optical axis B of the photographic lens 1. The image is shifted in a direction parallel to the optical axis B of the photographic lens 1 and the shift in direction is perpendicular to the optical axis B. The degree of vertical shift is sensed by a sensor 4 comprising two arrays of photo-electric transducing elements 4a and 4b positioned at the rear of the image re-forming optical system 3 respectively corresponding with the image forming lenses 3a and 3b. The use of this secondary imaging method makes it possible not only to detect when in-focus, but also, when out of focus, indicates the direction in which the sharp image shifts from the focal plane A, namely, near focus or far focus, even when the degree of image sharpness is easily measured.

However, the secondary image type sharp focus detecting device has drawbacks, which because the image reforming optical system 3 and the sensor 4 must be located behind the focal plane A of the photographic lens 1, the optical system becomes relatively large in size and is difficult to build into the photographic instrument. Furthermore, the optical system must be designed so that the light from the photographic lens 1 is efficiently conducted to the image re-forming optical system 3, and even when the diaphragm of the photographic lens 1 is stopped down to a minimal aperture opening, sufficient light enters the image re-forming optical system 3.

One solution for these problems is to construct the image re-forming optical system 3 of FIG. 1, in a form shown in FIG. 2, so that the two ordinary round lenses 3a and 3b are each partly cut off at a chord C to lens fragments 5a and 5b, which are then in contact at their chords C to make up a lens unit 5. The field lens 2 of FIG. 1 has a refractive power such that an image of a circle D with its diameter equal to the length of the chord C is formed near an exit pupil of the photographic lens 1 and within the diameter of the exit pupil. It is to be noted that in this case it is, of course, possible to make up the image reforming optical system 3 with each contacting lens 5 composed of a plurality of the lens elements or fragments 5a and 5b.

By the use of the contacted lens 5 as shown in FIG. 2, the size of the optical system is minimized, and it is possible to efficiently conduct the light bundle from the photographic lens 1 to the image re-forming optical system 3. But even using the contacted lens 5 there are problems. That is, the contacted portion C of the contacted lens 5 is discontinuous in curvature. When their contacted surfaces are fixed to each other by an adhesive agent, due to facts, such as the presence of an adhesive agent layer at contacted surfaces 6, light rays L1, L2, L3, L4 incident near the interface tend to be scattered, forming ghost and flare. Also, when the lens unit 5 is formed by molding techniques, the curvature near the chord C is likely to deform, very likely producing large aberrations when focusing the images. Furthermore, as illustrated in FIG. 3, when the image re-forming optical system 3 is constructed with two or more twin-lens units 5, it is also possible that, when the light rays L1, L2, L3 and L4 enter one image forming lens 3a, one ray L4 will migrate into the opposite image forming lens 3b through the contacted surfaces 6 or air separations 7 resulting in a mixture of the light rays L1, L2, L3, L4. If this takes place, isolation and symmetry of the two images by the image re-forming system 3 is imperfect, causing deterioration of focus detecting accuracy and leading to faulty operation.

The present invention solves the above problems and its object is to provide a sharp focus detecting device with a highly sensitive degree of image sharpness. There is no possibility of faulty operation because of the improvement in the isolation and symmetry of a plurality of images formed on photo-electric transducer element arrays.

Other objects of the invention will become apparent from the following description of embodiments thereof.

SUMMARY OF THE INVENTION

A focus detecting device for detecting a focus condition of an objective lens comprising image forming means for forming a plurality of images on the basis of respective light beams passing through different areas of a pupil of the objective lens, the image forming means being constructed in such a way that a plurality of optical members each corresponding to one image are contacted together as a unit; photo-electric transducing means receptive to all the images formed by the optical means for producing a signal for distinguishing between focus conditions of the objective lens; and light shielding means for preventing light beams incident upon one optical member of the image forming means from influencing the image formed by the other optical member.

BRIEF DESCRIPTION OF THE DRAWINGS

FIG. 4 is a sectional view of an embodiment of the image re-forming optical system in the sharp focus detecting device according to the present invention.

FIG. 5 is a front view of the lens of FIG. 4.

FIG. 6 is a sectional view of another embodiment of the invention.

FIG. 7 is a front view of still another embodiment of the invention.

FIG. 8 is a sectional view of a further embodiment of the invention.

DETAILED DESCRIPTION OF THE PREFERRED EMBODIMENTS

Figure 1:
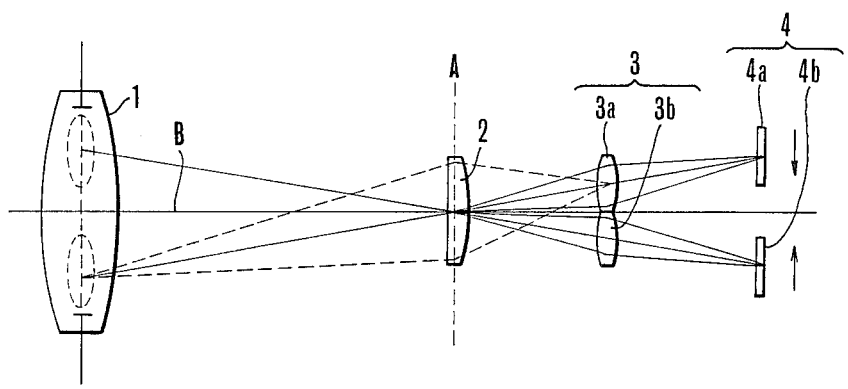
FIG. 1 is a sectional view of the so-called secondary imaging type sharp focus detecting device.
Figure 2:
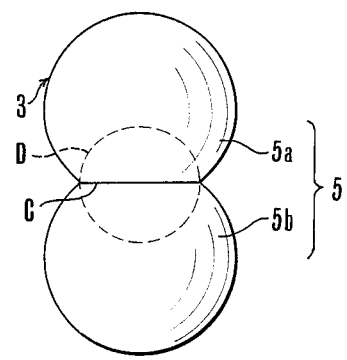
FIG. 2 is an elevational view of the contacted lens used as the image re-forming optical system in the device of FIG. 1.

In FIGS. 4 and 5, the image re-forming optical system 3 is constructed from one contacted lens 5. Reference numeral 10 identifies a light shielding mask. The other parts are similar in construction to those shown in FIG. 1. This light shielding mask 10 is provided adjacent to the incidence side of the contacted portion C of the contacted lens 5 shutting off the light rays L1, L2, L3, L4 coming from the photographic lens 1, which would otherwise arrive at the contacted portion C. The material used is one having excellent light shielding properties and as little reflection as possible.

Figure 3:
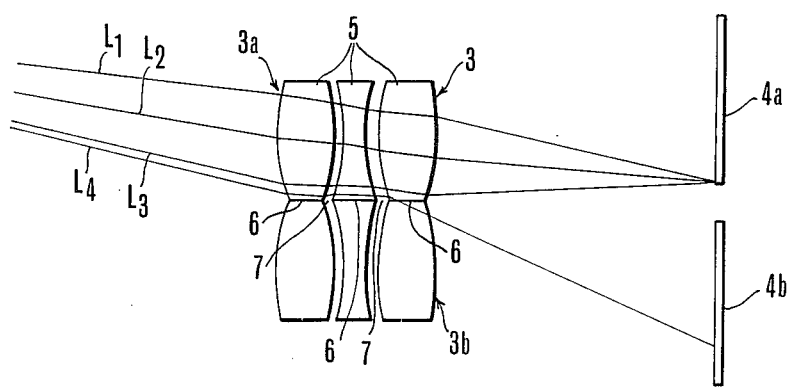
FIG. 3 is a sectional view of a plurality of contacted lenses employed as the image re-forming optical system.

The use of the light shielding mask 10 in preventing the incidence of the light rays L1, L2, L3, L4 on the contacted portion C of the contacted lens 5 and the area thereof provides the possibility of avoiding production of ghost and flare due to scattering at the contacted portion C. Also, even when a plurality of contacted lenses 5 are used in constructing the image re-forming optical system 3 as illustrated in FIG. 6, the use of a similar light shielding mask 10 in front of the contacted portion C blocks the light rays L4 which are affected by the contacted portion C, at the front of the contacted lens 5 so that any of the light rays L1, L2 and L3 which have entered one image forming lens 3a can never migrate into the opposite image forming lens 3b. Therefore no mixture of the light rays L1, L2, L3, L4, described in connection with FIG. 3, takes place.

It is to be noted that the outer effective diameter of the image re-forming optical system 3 is usually limited by an apertured mask 11 so that only the light rays L1, L2, L3, L4 passing through the exit pupil of the photographic lens 1 (see FIG. 1) are received. This apertured mask 11 may be combined with the aforesaid light shielding mask 10 to form a mask unit 12 in FIG. 7. That is, by using the specially shaped light shielding mask 12, as formed from the mask 11 having apertured portions within a circle D and the light shielding mask 10, the necessary number of masks 10, 11 can be reduced in both two to one. This is advantageous from manufacturing and handling.

Furthermore for the purpose of preventing a mixture of light rays L1, L2, L3, L4 across the contacted portion C of the contacted lens 5, a coating of the light shielding property is applied to the contacted portion C as a counter-measure, or a thin plate-like light shielding piece having the light shielding effect is seated inside the contacted portion C. Also, in situations where the image re-forming optical system 3 is constructed with a plurality of contacted lenses 5, the aforesaid light shielding pieces 10, 11, 12 may all form a common light shielding plate 13. Thereby the two image forming lenses 3a and 3b are optically insulated from each other improving light shielding reliability.

As described above, according to the present invention, the secondary image type sharp focus detecting device is provided with a light shielding member 10, 11, 12 or 13 at the contacted portion C of the contacted lens 5 of the image re-forming optical system 3, so that the isolation and symmetry of two images formed by the image re-forming optical system 3 are more nearly perfect, improving the detection accuracy of the sharp focus and faulty operation is prevented with greater reliability.

I claim:

1. A focus detecting device for detecting a focus condition of an objective lens, comprising:
   (a) image forming means for forming a plurality of images on the basis of respective light beams passing through different areas of a pupil of said objective lens, said image forming means cutting off part of outer peripheries of lens components for combining the cut off components at their cut off portions into a united form;
   (b) photo-electric transducing means receptive of all the images formed by said lens components for producing a signal for distinguishing between focus conditions of said objective lens; and
   (c) light shielding means for preventing light beams incident upon one lens component of said image forming means from influencing the image formed by the other lens component;
   and wherein said light shielding means is positioned near the contacted portion of each of the lens components.

2. A device according to claim 1, wherein said light shielding means is positioned in front of the contacted portion of each of the lens components.

3. A device according to claim 2, wherein said light shielding means is formed as a unit with another light shielding means for defining an area at which light beams enter said image forming means.

4. A device according to claim 1, wherein said light shielding means is positioned inside of the contacted portion of each of the lens components.

5. A device according to claim 1, in which each of the lens components comprises a plurality of lenses arranged along the optical axis.

6. A device according to claim 1, in which said image forming means is unitedly formed.

* * * * *